United States Patent
Wang et al.

(10) Patent No.: US 11,586,447 B2
(45) Date of Patent: Feb. 21, 2023

(54) CONFIGURATION AFTER CLUSTER MIGRATION

(71) Applicant: INTERNATIONAL BUSINESS MACHINES CORPORATION, Armonk, NY (US)

(72) Inventors: Cheng Fang Wang, Beijing (CN); Li Cao, Beijing (CN); Peng Fei Tian, Beijing (CN); Hong Yi Zhang, Beijing (CN); Yong Wu, Beijing (CN); Bin Xu, Beijing (CN); Qing Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 464 days.

(21) Appl. No.: 16/668,003

(22) Filed: Oct. 30, 2019

(65) Prior Publication Data
US 2021/0132957 A1    May 6, 2021

(51) Int. Cl.
*G06F 9/4401*    (2018.01)
*G06F 9/50*      (2006.01)

(52) U.S. Cl.
CPC .......... *G06F 9/4416* (2013.01); *G06F 9/5072* (2013.01)

(58) Field of Classification Search
None
See application file for complete search history.

(56) References Cited

U.S. PATENT DOCUMENTS

| | | | |
|---|---|---|---|
| 9,602,614 B1* | 3/2017 | Shankaran | H04L 67/34 |
| 10,146,567 B2 | 12/2018 | Sivak | |
| 10,282,222 B2 | 5/2019 | Thakkar | |
| 11,038,986 B1* | 6/2021 | Acar | H04L 67/10 |
| 2010/0095105 A1* | 4/2010 | Sevak | G06F 9/4416 713/2 |
| 2012/0151040 A1* | 6/2012 | Mouravyov | H04L 41/0859 709/224 |
| 2014/0129819 A1* | 5/2014 | Huang | G06F 9/4416 713/2 |
| 2019/0034297 A1 | 1/2019 | Basur Shankarappa | |
| 2019/0356541 A1* | 11/2019 | Finn | H04L 41/0806 |

OTHER PUBLICATIONS

Mell et al., "The NIST Definition of Cloud Computing", Recommendations of the National Institute of Standards and Technology, Special Publication 800-145, Sep. 2011, 7 pages.
Ye et al., "VC-Migration: Live Migration of Virtual Clusters in the Cloud", 2012 ACM/IEEE 13th International Conference on Grid Computing, 2012 IEEE, pp. 209-218.

* cited by examiner

*Primary Examiner* — Fahmida Rahman
(74) *Attorney, Agent, or Firm* — Teddi E. Maranzano

(57) ABSTRACT

A method, computer system and computer program product for processing configuration after a cluster migration are provided. In this method, a network booting program is received at a computing node from a management node for a cluster. The cluster includes at least one computing node. An operating system is booted in a memory of the computing node with the received network booting program. Configuration changes are received from the management node, and the configurations in a local storage of the computing node are updated according to the received configuration changes.

20 Claims, 6 Drawing Sheets

CONFIGURATION AFTER CLUSTER MIGRATION

BACKGROUND

The present invention relates to data processing, and more specifically, to a method, computer program and computer program product for processing configuration after a cluster migration.

In complicated cloud and data center environments, sometimes it is required to migrate a cluster of physical machines from a source environment to a target environment. For example, an existing cluster of physical machines may need to be moved to a new site, or a cluster localization needs to be pre-configured and delivered to a customer. Traditional manual processes tend to be error prone. This is because the clusters are stateful and consist of multiple layer of software, for example, operating systems, network services, storage, and applications.

SUMMARY

According to an embodiment of the present invention, there is provided a method for processing configuration after a cluster migration. In this method, a network booting program is received at a computing node from a management node of a cluster. The cluster includes at least one computing node. An operating system is booted into a memory of the computing node by the received network booting program. Configuration changes are received from the management node, and the configurations in a local storage of the computing node are updated according to the received configuration changes.

Other embodiments and aspects, including but not limited to, computer systems and computer program products, are described in detail herein and are considered a part of the claimed invention.

These and other features and advantages of the present invention will be described, or will become apparent to those of ordinary skill in the art in view of, the following detailed description of the example embodiments of the present invention.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
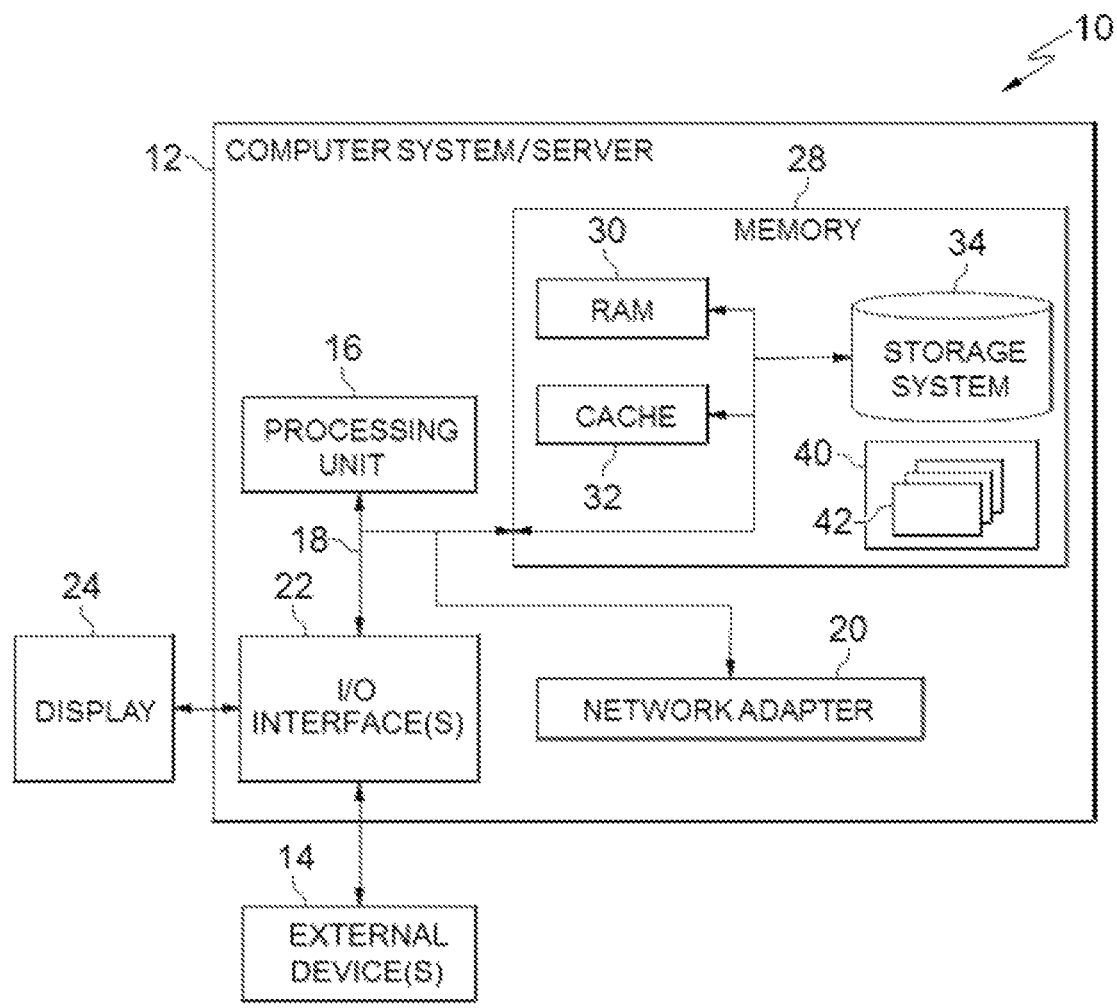
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer can deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
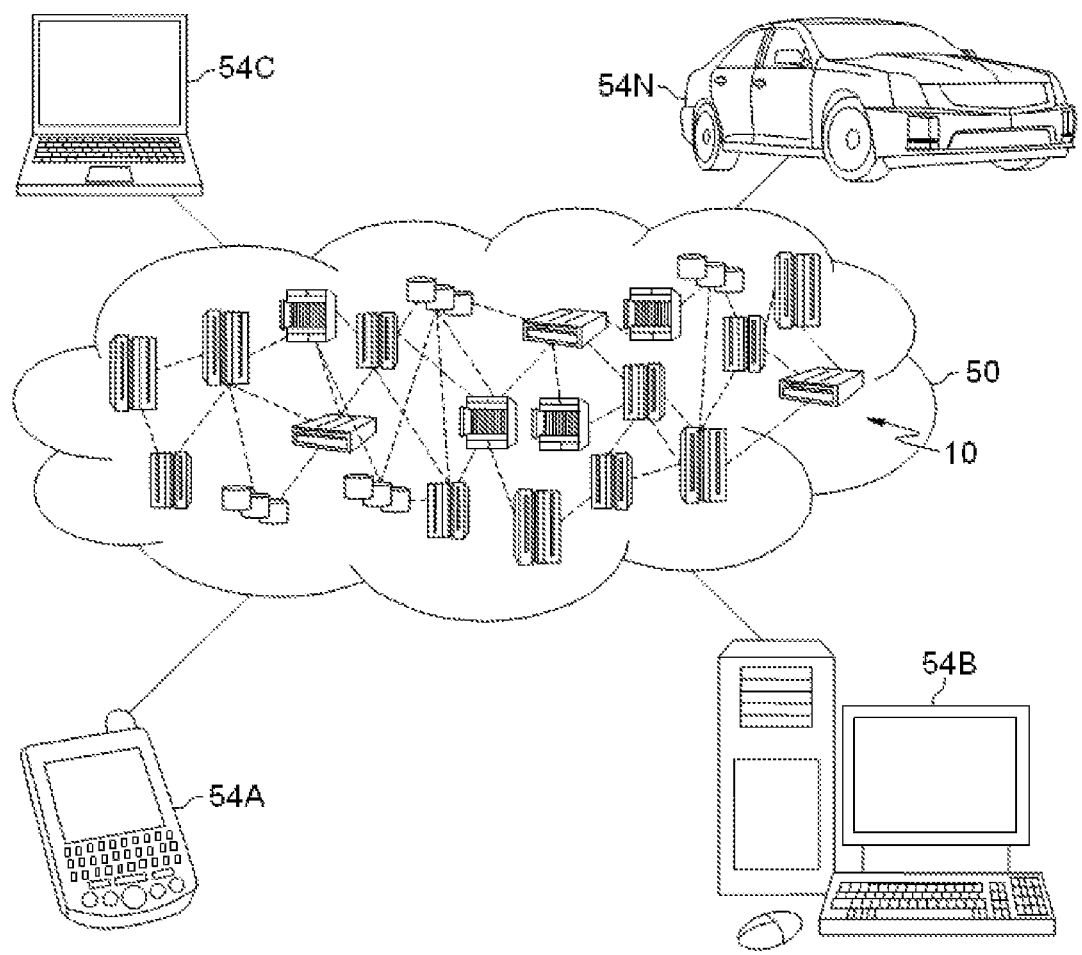
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
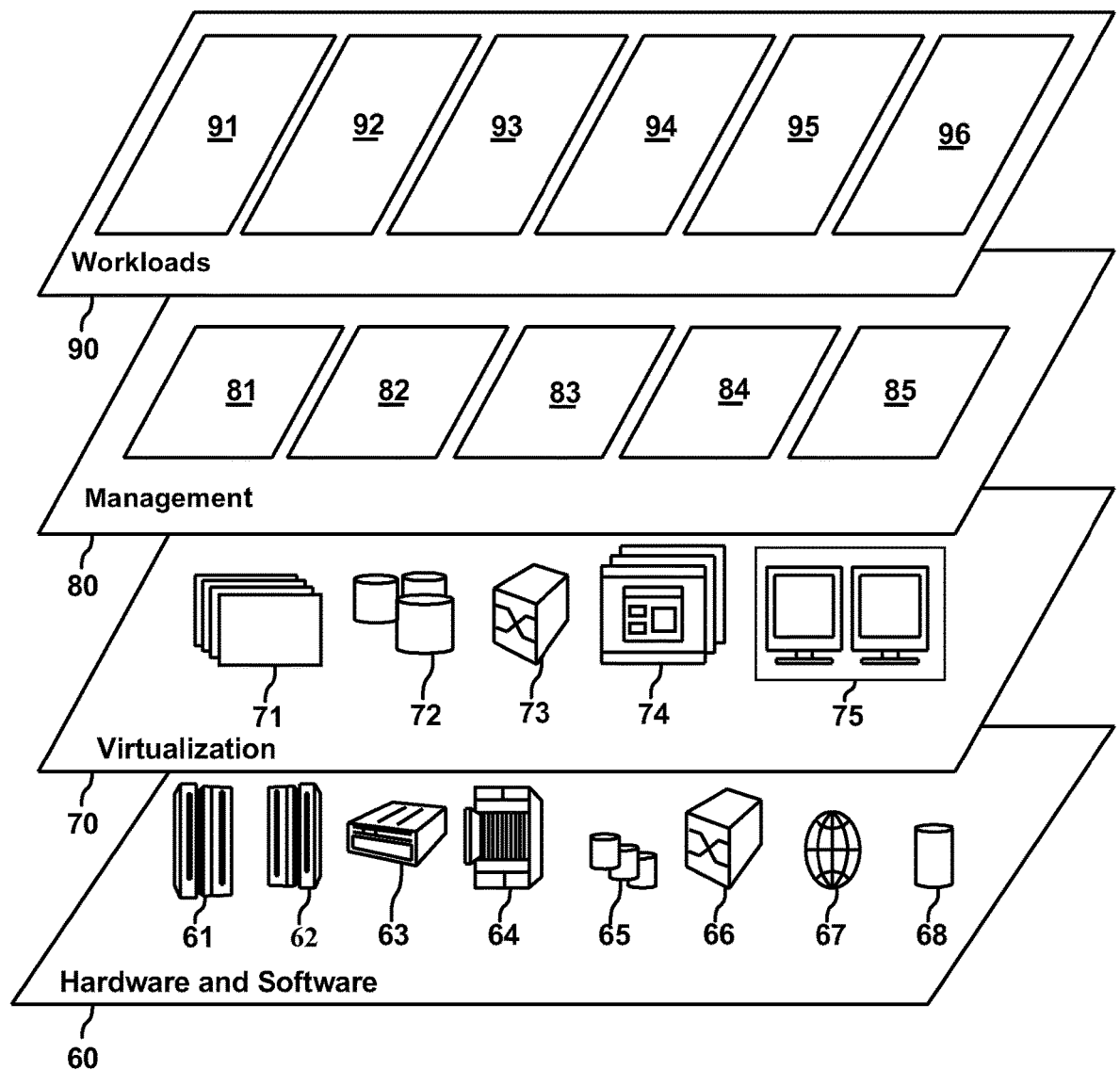
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and configurations for cluster migration 96.

There are many challenges for physical machine cluster migration in infrastructure level. For example, when a computing node in a cluster is migrated from a source environment to a target environment, the computing node may not know the new IP address of the target environment and all of the network configuration would be changed. The network parameters are all changed due to the change of machine IPs, and the network services are changed since the infrastructure network is changed, etc.

Use IP address as an example. Before the migration, the original IP addresses for the entities in the cluster may start with 10.10.10. For example, LDAP Server IP is 10.10.10.130, DNS Server IP is 10.10.10.120, TFTP Server IP is 10.10.10.121, Computing Node #1 IP is 10.10.10.10, Computing Node #N is 10.10.10.100, etc. After the migration, the IP addresses for the cluster may start with 192.168.2. For example, LDAP Server IP is changed to 192.168.2.130, DNS Server IP is changed to 192.168.2.120, TFTP Server IP is changed to 192.168.2.121, Computing Node #1 IP is changed to 192.168.2.10, Computing Node #N is changed to 192.168.2.100, etc. If the IP addresses are not reconfigured after migration, the computing nodes could not connect to the network then.

Some exiting technologies may only cover upper applications and cluster level reconfiguration and cannot cover the migration in infrastructure level. Some exiting solutions may cover some infrastructure level migrations, but they have limitations. For example, they can only work in an initial operating system (OS) (in-band), just like Run Control (RC) Scripts, and their own OS is used to do reconfiguration which have low robustness. The network may be lost after reconfiguration. And since there is no way for a master node to do any health check, if the new configuration has any error, the migrated computing nodes would fail.

According to embodiments of the present invention, a solution is proposed to help reconfigure a cluster of computing nodes after those are migrated to a new site and make sure of the network correctness in the infrastructure level. In this solution, instead of booting the original OS in the local storage of the migrated computing node, a network booting program is loaded into the memory of the computing node to boot the computing node from a memory OS and use the memory OS to do the migration task.

Figure 4:
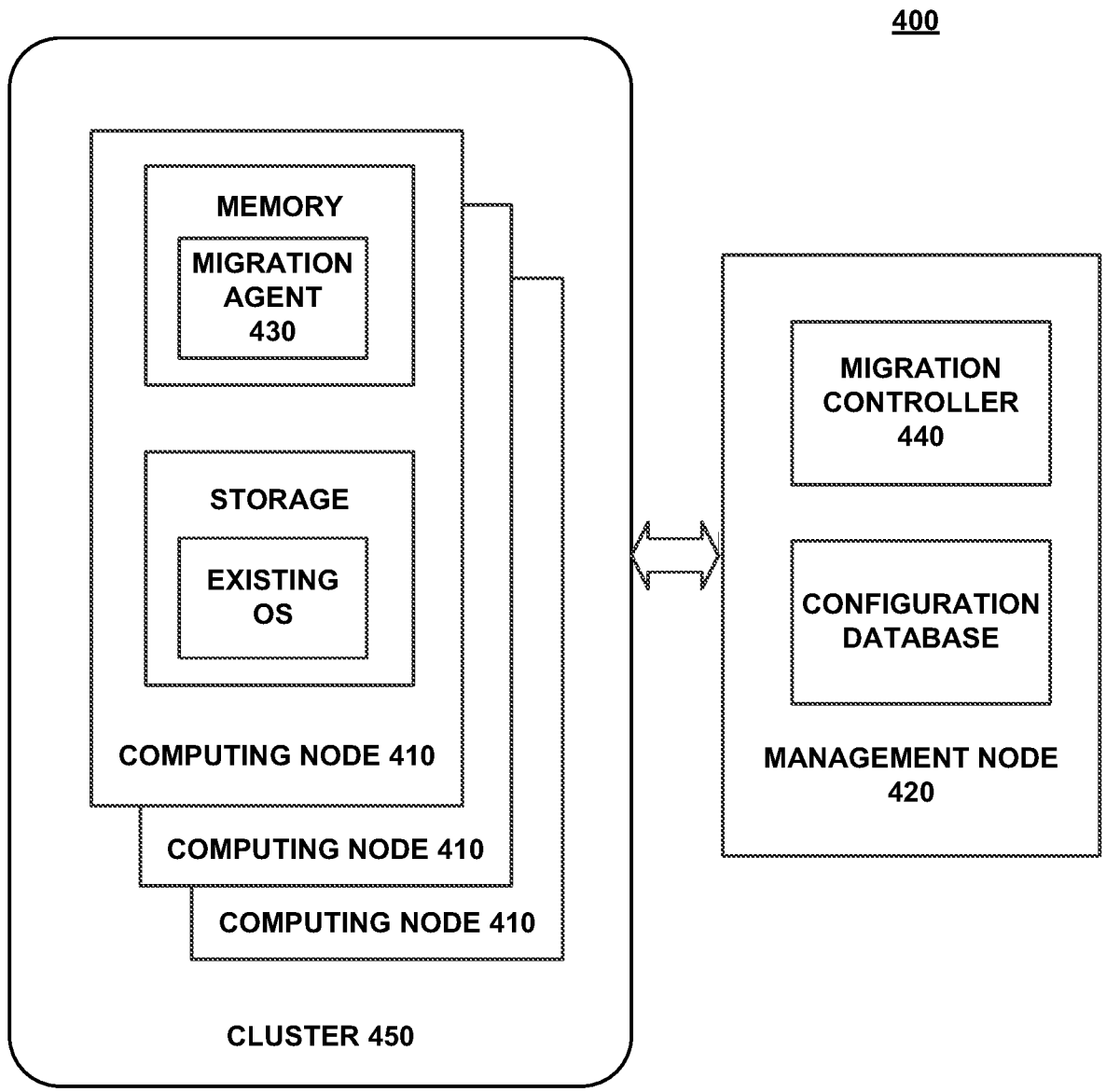
FIG. 4 illustrates an example system which is applicable to implement one or more embodiments of the present invention.

FIG. 4 illustrates an example system which is applicable to implement one or more embodiments of the present invention. The system 400 includes one or more computing nodes 410 in a cluster 450 and a management node 420 for the cluster 450. A migration controller 440 may be implemented in the management node 420. After the cluster of the computing nodes are migrated from a source environment to a target environment, the migration controller 440 gathers the cluster configuration changes and stores the configuration changes in a configuration database in the management node 420. Please note that although only one management node 420 is shown in FIG. 4, there may be additional management nodes 420 for a cluster, and the migration controller 440 may be implemented among the additional management nodes 420. According to an embodiment of the present invention, the management node 420 may be a node within the cluster 450. According to another embodiment of the present invention, the management node 420 may not belong to the cluster 450. However, in that case, the management node 420 is connected to the computing nodes 410, either physically, or by network.

In the context of the present invention, the computing node 410 may be a physical machine with network booting function enabled. The network booting is a process of booting a computer remotely from a network rather than by booting the computer at the physical machine from the local drive. Through the network booting process, a network booting program may be loaded to the memory of the computing node 410 from the management node 420. While there may be an operating system of the computer node 410 existing in a local storage of the computing node 410 (referenced to as "storage OS" hereinafter), an operating system may be booted in the memory of the computing node 410 (referenced to as "Memory OS" hereinafter) with the network booting program. The operating system to be used in booting the computing node 410 may be the same or different than that in the local storage or memory. With the Memory OS, a migration agent 430 may be implemented in the memory of the computing node 410. The migration agent 430 may receive configuration changes from the migration controller 440 and update the configurations in the computing node 410 according to the received configuration changes. The configurations in the computing node 410 may include OS configuration, network configuration, and application configuration.

Please note that the storage of the computing node 410 may be any non-removable, non-volatile magnetic media (typically called a "hard drive"). Or a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be used. Those skilled in the art recognize that the system 400 may be simpler or more complex than illustrated, so long as the system 400 includes modules or sub-systems that correspond to those described herein.

According to an embodiment of the present invention, one example of the network booting is Preboot Execution Environment (PXE) booting. When many computer clients must be booted, a popular solution is to utilize a PXE booting environment. PXE booting allows a computer to be booted without having to physically insert a boot disk into the machine or have an operating system already installed. PXE booting relies on the functionality of the Dynamic Host Configuration Protocol (DHCP) and Trivial File Transfer Protocol (TFTP) to send a small software boot image down to the network interface card of client machines. DHCP is used by a client to locate a boot server from which the client will receive the software boot image. Additionally, TFTP is used to actually download the software boot image.

DHCP is used to provide appropriate client network parameters and specifically the location (IP address) of the TFTP server hosting the initial network bootstrap program (NBP) and complementary files. To initiate a PXE bootstrap session, the DHCP component of the client's PXE firmware broadcasts a packet containing PXE-specific options to a DHCP-defined port (DHCP server port), requesting the network configuration and network booting parameters. The requested parameters are used to boot the client over the network and to join the client to the cluster. The PXE-specific options identify the initiated DHCP transaction as a PXE transaction. After receiving the requested parameters from a PXE enabled DHCP server, the client will be able to set its own network IP address, IP Mask, etc. The client can then point to the booting resources that are located on the network, based on the received TFTP Server IP address and the name of the NBP. The client transfers the NBP into its own random-access memory (RAM) using TFTP, and boots from it.

The computing node 410 may be any computer system configured with PXE booting code to request and download a booting image. It may include a Network Interface Card (NIC) (not shown in FIG. 4) to communicate with the management node 420. According to an embodiment of the present invention, during the PXE booting, the management node 420 listens on a management network for the computing node 410's request. Upon receiving a booting request from the computing node 410, the migration controller 440 sends the booting image to the computing node 410 to start the migration agent 430.

Figure 5:
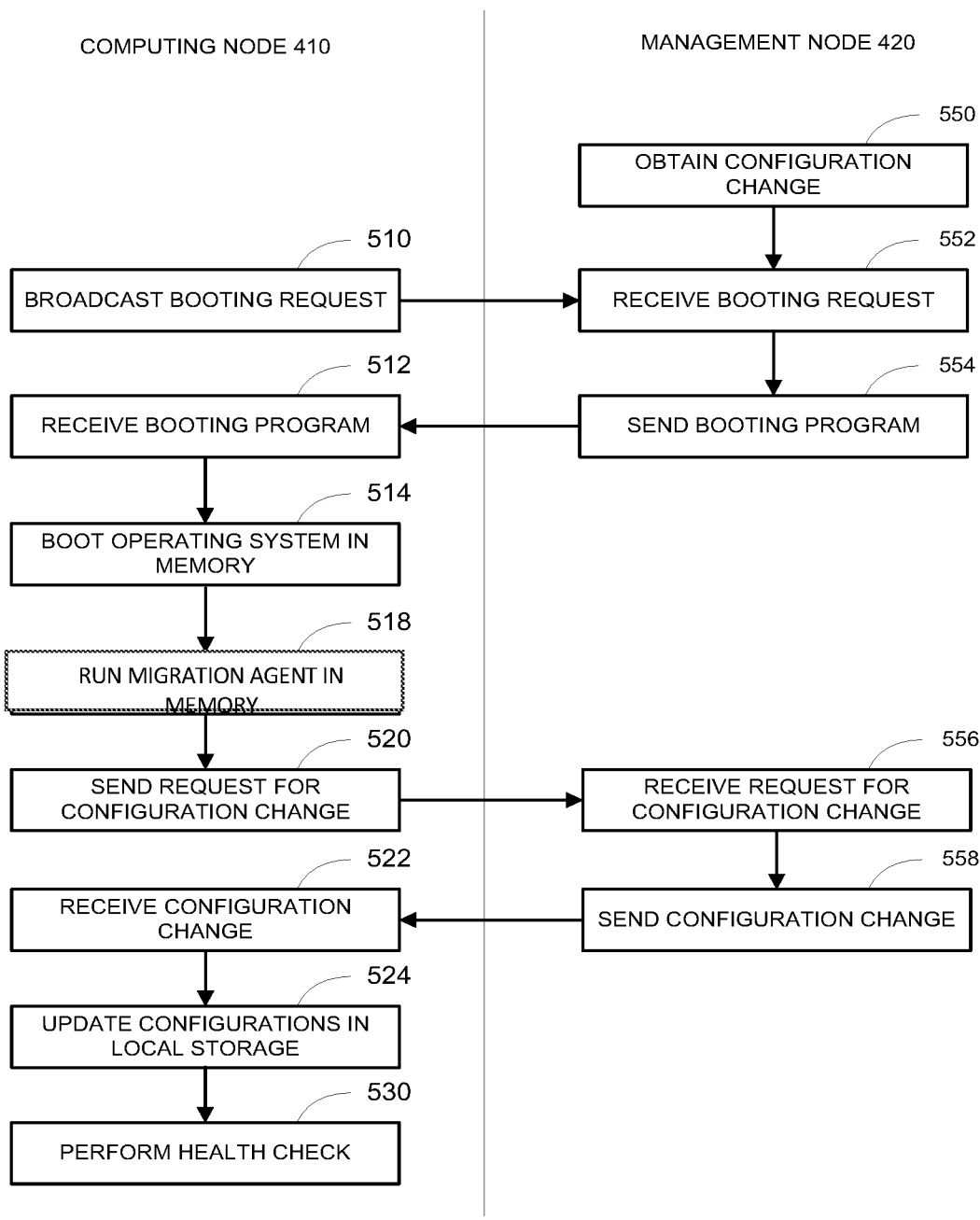
FIG. 5 illustrates a flow chart showing a process according to an embodiment of the present invention.

FIG. 5 illustrates a flow chart showing a series of actions between the computing node 410 and the management node 420 according to an embodiment of the present invention.

As stated above, the computing node 410 may be one of the physical computers within a cluster which, for example, have been moved from one site to another site and need migration configuration due to changes in configuration parameters. The management node 420 may or may not be a node within the cluster. However, the management node 420 is connected to the computing nodes 410 at least by a network. A migration controller 440 may be initiated on the management node 420 to perform the steps in the management node 420 as illustrated in FIG. 4.

At step 550, the migration controller 440 obtains configuration changes to be used for the cluster migration configuration. According to embodiments of the present invention, the migration controller 440 may scan existing configurations of the systems and applications for the nodes of the cluster to obtain configuration snapshots for the nodes in the cluster. The configuration snapshots, existing configuration data, and applications for each computing node 410 can be stored in the configuration database of the management node 420. An administrator may make some changes to the configuration parameters. Based on those changes to the configurations, the migration controller 440 may generate configuration changes for some or all of the computing nodes in the cluster based on the original configuration snapshots and the changes made by the administrator.

According to embodiments of the present invention, the configuration changes may be applicable to the whole cluster or the configuration changes may be specific to the computing node. For example, the computing nodes may play different roles in the cluster and the applications installed in the computing nodes may be different, so the migration controller 440 may generate different configuration changes for different computing nodes.

At step 510, a network booting request is broadcasted from the computing node 410. At step 552, the management node 420 receives the network booting request from the computing node 410. The management node 420 may also be a DHCP server.

At step 554, the migration controller 440 sends a network booting program to the computing node 410. The computing node 410 receives the network booting program at step 511. The network booting program may be used to boot the computing node 410 via a Memory OS. As mentioned above, one example of the network booting is Preboot Execution Environment (PXE) booting. And the network booting program may include the NBP and complementary files. The received network booting program may be loaded into the memory of the computing node 410.

At step 514, the computing node 410 boots an operating system in its memory with the received network booting program. This operating system in the memory is called Memory OS herein. At step 518, a migration agent 430 is run in the Memory OS of the computing node 430.

At step 520, the migration agent 430 sends a request to the migration controller 440 for the configuration changes. According to an embodiment of the present invention, the migration agent 430 may collect some inventory information from the computing node and include such inventory information in the request to the migration controller 440. Inventory information may include amount of memory installed, the number and location of hardware interface cards, and the number of CPUs installed.

Upon receiving the request for the configuration changes at step 556, at step 558, the migration controller 440 sends the configuration changes to the computing node 410. As mentioned above, the configuration changes sent to the computing node 410 may be specific to the computing node 410. For example, upon receiving the request with inventory information of the computing node 410, the migration controller 440 may select the configuration changes based on the inventory information included in the request. In an embodiment, steps 520 and 556 may be omitted if one or more computing nodes 410 requests a configuration change. A configuration change may include a request to add or remove software packages in the operating system, or an operating system update. The configuration changes may be sent to the computing node 410 from the management node 420 any time after the management node 420 receives the network booting request at step 552.

After receiving the configuration changes at step 522, at step 524, the migration agent 430 updates configurations in the local storage of the computing node 410 based on the received configuration changes. According to an embodiment of the present invention, the configurations in the local storage may include configurations in OS, network, application, etc. According to an embodiment of the present invention, the migration agent 430 may mount the local storage of the computing node 410 to obtain the configurations in the local storage of the computing node 410 and inject the configuration changes from the memory to the local storage of the computing node 410 to update the configurations in the local storage. Before a computer can use any kind of storage device (such as a hard drive, CD-ROM, or network share), the operating system must make it accessible through the computer's file system. This process is called mounting. And only files on mounted media can be accessed.

After the configurations in the local storage is updated, a health check may be performed by the migration agent 430 at step 530. The health check process would help to make sure that the configurations in the computing node 410 has been updated correctly.

With the process as illustrated in FIG. 5 and described above, after migration, the computing node 410 may be reconfigured automatically despite the changes of configuration parameters due to the migration.

Figure 6:
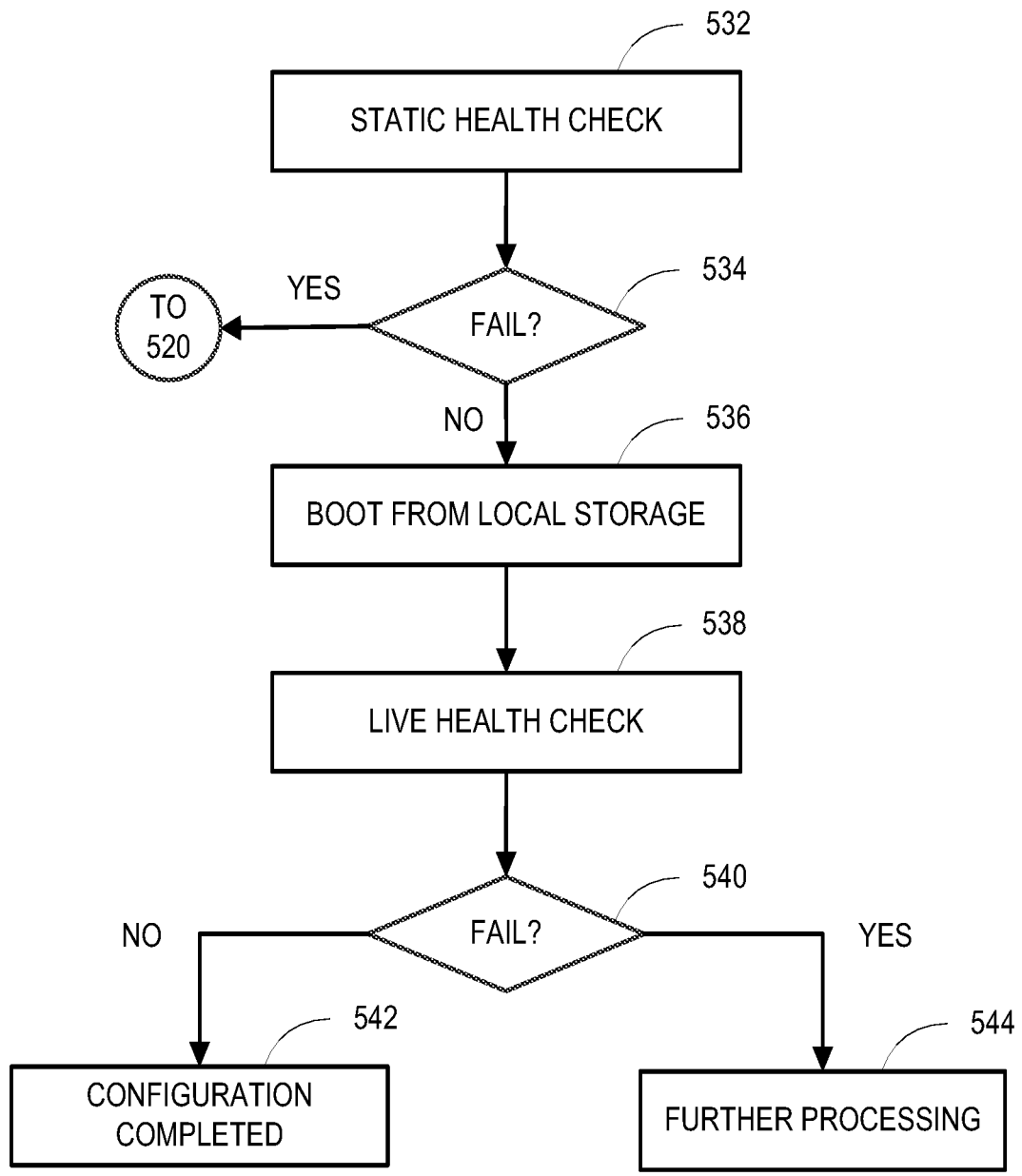
FIG. 6 illustrates a flow chart showing a health check process according to an embodiment of the present invention.

FIG. 6 illustrates a flow chart showing a health check process performed in step 530 according to an embodiment of the present invention.

After the migration agent 430 updates configuration in the local storage of the computing node 410 at step 524, at step 532, the migration agent 430 performs a static health check by verifying the configurations in the local storage of the computing node 410 with the configuration changes received from the migration controller 420. The term "static" is used herein to indicate that the computing node 410 has not been booted with the operating system stored in its local storage.

At step 534, the migration agent 430 determines whether the static health check fails or not. If the static health check fails, the process goes back to step 520 as shown in FIG. 5, repeating the step of receiving configuration changes from the migration controller 440 and changing configurations in the local storage of the computing node 410 according to the received configuration changes. If the static health check passes, the process goes to step 536 to boot the computing node 410 from its local storage. The migration agent 430 may change the booting order from network booting to local booting and then boot the computing node 410 from its local storage.

At step 538, the migration agent 430 performs a live health check on the computing node. The live health check may also be called as dynamic health check, which would be used to determine whether the computing node functions normally. For example, the live health check may identify whether each layer of the service functions fails or not. The term "live" or "dynamic" is used herein to indicate that the computing node 410 has been booted with the operating system stored in its local storage. At step 540, the migration agent 430 determines whether the live health check fails or not. If the live health check passes, the process goes to step 542 where the migration configuration is completed. If the live health check fails, the process goes to step 544 for further processing. Different actions may be taken for the further processing. For example, the computing node 410 may try to contact the migration controller 440 with its new IP address to see if the new IP address is correct. If failed, the configuration changes obtained by the migration controller may be checked and updated if necessary, and the migration agent 430 on the computing node 410 may change the booting order back to the network booting and repeat the process illustrated in FIG. 5 and described above again.

Please note that although in the health check process as illustrated in FIG. 6 there are both static health check and live health check performed, the step of performing the static health check may be omitted. That is the steps of 532 and 534 may be omitted from the process shown in FIG. 6.

After migration, the migration controller 440 may obtain configuration changes and know that all of the IP addresses of the computing nodes 410 in the cluster would be changed from 10.10.10 to 192.168.2, for example. When the migration controller 440 receives a network booting request from a computing node 410 in the cluster, it sends a network booting program to the computing node 410 to boot an operating system in the memory of the computing nodes and runs a migration agent 430 with the operating system in the memory. The management node 420 also sends the configuration changes to the computing node 420, indicating the IP address is changed from 10.10.10 to 192.168.2. The migration agent 430 receives the configuration changes, mounts the local storage of the computing node 410 and injecting the configuration changes to the local storage, that is, changing the IP address configuration in the local storage from 10.10.10 to 192.168.2. To ensure proper network connectivity among the computing nodes 410 and the management node 420, the IP addresses for the DNS server, TFTP server and possibly the LDAP server are changed in the computing node 410 local storage. Similar actions may be performed for other computing nodes in the cluster.

With the process according to embodiments of the present invention, a flexible framework may be provided, and the infrastructure level configurations may be migrated.

It should be noted that the method for processing configuration after a cluster migration according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    receiving, by the one or more processors, at a computing node a network booting program from a management node for a cluster, the cluster including at least one computing node;
    booting, by one or more processors, an operating system in a memory of the computing node with the received network booting program;
    executing a migration agent in the operating system in the memory of the computing node, wherein the migration agent collects and sends inventory information to a migration controller, together with a request for configuration changes;
    wherein the configuration changes indicate a cluster configuration change based on the inventory information, the cluster configuration change is based on an expected migration of the cluster from a source computing environment to a target computing environment;
    receiving the configuration changes from the management node, by the one or more processors and updating the configuration changes indicating changes of the configurations in the computing node after the migration; and
    updating, by the migration agent, configurations in a local storage of the computing node according to the received configuration changes.

2. The method of claim 1, wherein updating, by the one or more processors, configurations in the local storage of the computing node according to the received configuration changes comprises:
    mounting, by the one or more processors, the local storage of the computing node to obtain the configurations in the local storage of the computing node; and
    injecting, by the one or more processors, the configuration changes from the memory to the local storage of the computing node to update the configurations in the local storage.

3. The method of claim 1, further comprising:
    performing, by the one or more processors, a health check on the computing node.

4. The method of claim 3, wherein performing, by the one or more processors, the health check on the computing node comprises:
    performing, by the one or more processors, a static health check on the computing node by verifying the configurations in the local storage of the computing node according to the received configuration changes.

5. The method of claim 4, wherein performing, by the one or more processors, the health check on the computing node further comprises:
    in response to the static health check being failed, repeating the steps of receiving configuration changes from the management node and updating configurations in the local storage of the computing node according to the received configuration changes.

6. The method of claim 3, wherein performing, by the one or more processors, the health check on the computing node comprises:
    booting, by the one or more processors, the computing node from an operating system in the local storage; and
    performing, by the one or more processors, a live health check on the computing node to determine whether the computing node functions normally.

7. The method of claim 1, wherein the network booting program includes an initial network bootstrap program (NBP) and complementary files for a Preboot Execution Environment (PXE) booting.

8. A computer system comprising:
    one or more processors;
    a memory coupled to at least one of the one or more processors;
    a set of computer program instructions stored in the memory and executed by at least one of the one or more processors in order to perform actions of:
        receiving at a computing node a network booting program from a management node for a cluster, the cluster including at least one computing node;
        booting an operating system in a memory of the computing node with the received network booting program;
        executing a migration agent in the operating system in the memory of the computing node, wherein the migration agent collects and sends inventory information to a migration controller, together with a request for configuration changes;
    wherein the configuration changes indicate a cluster configuration change based on the inventory information, the cluster configuration change is based on an expected migration of the cluster from a source computing environment to a target computing environment;
    in response to receiving the configuration changes from the management node, updating the configuration changes indicating changes of the configurations in the computing node after the migration; and
    updating, by the migration agent, configurations in a local storage of the computing node according to the received configuration changes.

9. The computing system of claim 8, wherein the action of updating configurations in the local storage of the computing node according to the received configuration changes comprises:
    mounting the local storage of the computing node to obtain the configurations in the local storage of the computing node; and
    injecting the configuration changes from the memory to the local storage of the computing node to update the configurations in the local storage.

10. The computing system of claim 8, the actions further comprise:
    performing a health check on the computing node.

11. The computing system of claim 10, wherein the action of performing the health check on the computing node comprises:

performing a static health check on the computing node by verifying the configurations in the local storage of the computing node according to the received configuration changes.

12. The computing system of claim 11, wherein the action of performing the health check on the computing node further comprises:
in response to the static health check being failed, repeating the steps of receiving configuration changes from the management node and updating configurations in the local storage of the computing node according to the received configuration changes.

13. The computing system of claim 10, wherein the action of performing the health check on the computing node comprises:
booting the computing node from an operating system in the local storage; and
performing a live health check on the computing node to determine whether the computing node functions normally.

14. The computing system of claim 8, wherein the network booting program includes an initial network bootstrap program (NBP) and complementary files for a Preboot Execution Environment (PXE) booting.

15. A computer program product comprising a computer readable storage medium having program instructions embodied therewith, the program instructions being executable by a device to perform a method comprising:
receiving at a computing node a network booting program from a management node for a cluster, the cluster including at least one computing node;
booting an operating system in a memory of the computing node with the received network booting program;
executing a migration agent in the operating system in the memory of the computing node, wherein the migration agent collects and sends inventory information to a migration controller, together with a request for configuration changes;
wherein the configuration changes indicate a cluster configuration change based on the inventory information, the cluster configuration change is based on an expected migration of the cluster from a source computing environment to a target computing environment;
in response to receiving the configuration changes from the management node, by one or more processors, updating the configuration changes indicating changes of the configurations in the computing node after the migration; and
updating, by the migration agent, configurations in a local storage of the computing node according to the received configuration changes.

16. The computer program product of claim 15, wherein updating configurations in the local storage of the computing node according to the received configuration changes comprises:
mounting the local storage of the computing node to obtain the configurations in the local storage of the computing node; and
injecting the configuration changes from the memory to the local storage of the computing node to update the configurations in the local storage.

17. The computer program product of claim 15, the method further comprises:
performing a health check on the computing node.

18. The computer program product of claim 17, wherein performing the health check on the computing node comprises:
performing a static health check on the computing node by verifying the configurations in the local storage of the computing node according to the received configuration changes.

19. The computer program product of claim 16, wherein performing the health check on the computing node comprises:
booting the computing node from an operating system in the local storage; and
performing a live health check on the computing node to determine whether the computing node functions normally.

20. The computer program product of claim 15, the network booting program includes an initial network bootstrap program (NBP) and complementary files for a Preboot Execution Environment (PXE) booting.

* * * * *